United States Patent Office 3,319,406
Patented May 16, 1967

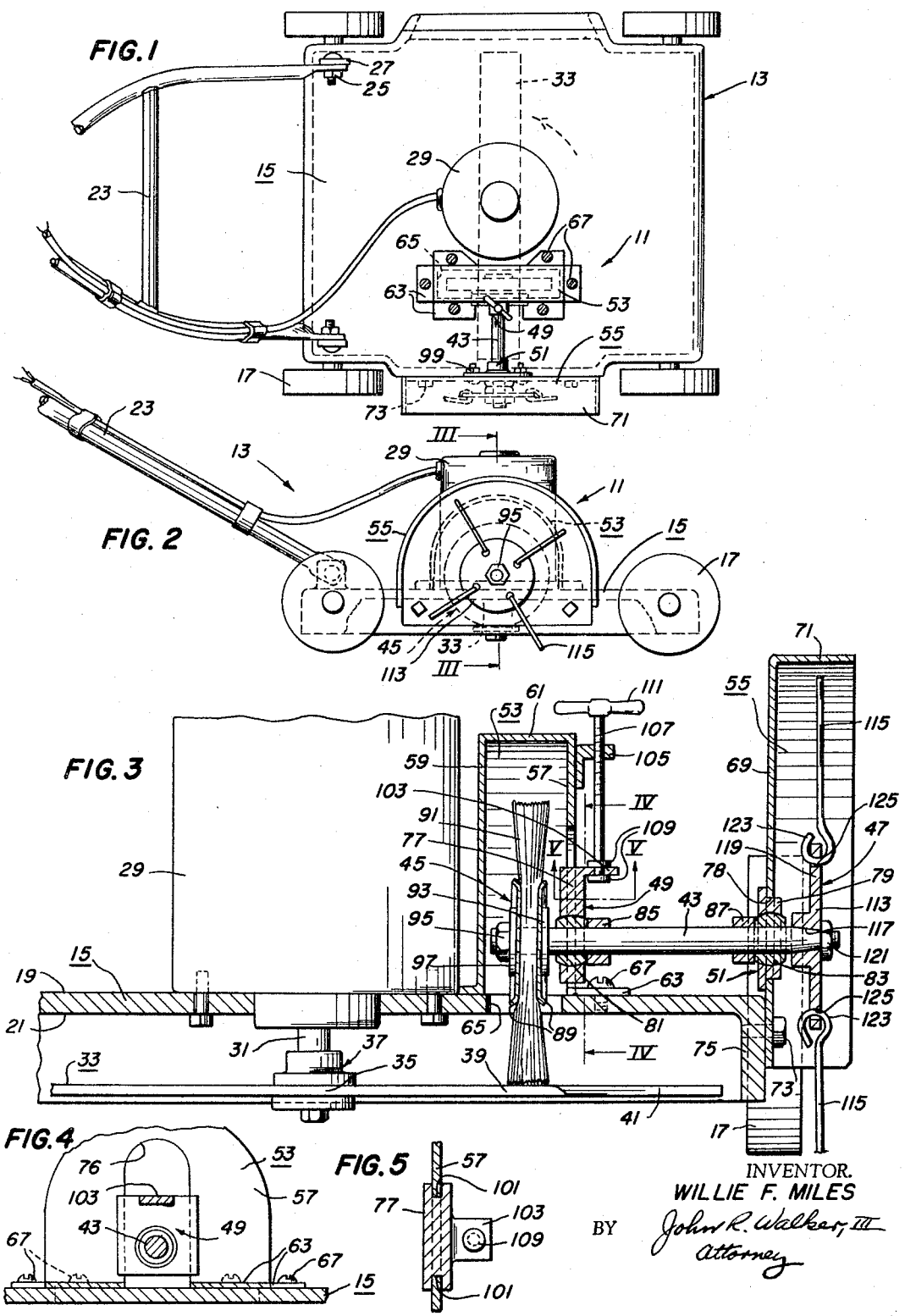

3,319,406
LAWN EDGING MECHANISM IN A LAWN MOWER
Willie F. Miles, 412 Malbro Road,
Memphis, Tenn. 38117
Filed July 30, 1964, Ser. No. 386,155
2 Claims. (Cl. 56—25.4)

This invention relates generally to lawn care tools and particularly to a lawn edging mechanism conjunctively operable with a rotary lawn mower.

Generally, the two basic operations in the care of a lawn are the mowing and edging operations. Since the advent of powered lawn tools, it is not uncommon for the typical homeowner to have both a power mower and a power edger. Various devices have been devised, however, which were directed towards the provision of a single machine which would be satisfactorily operable for performing both these operations. In the design of the majority of these devices, such effort has been directed along the line of providing an attachment mechanism for a rotary lawn mower. A problem apparent in such prior devices has been that they were complicated and often included belts, chains or other such structure which was difficult to keep in proper working order. Many of the prior devices had rotating driving parts or the like which were disposed in the lawn mower blade housing, and such parts which had a tendency to catch grass and to clog or interfere with the lawn mowing action. Moreover, many of the prior attachment devices required considerable alteration to the existing structure of the rotary lawn mower in the installation of the device, and such installation often required considerable skill.

One of the principal objects of the present invention is to provide a substantially simple and sturdy edging mechanism in a lawn mower which has no pulleys, chains or the like to get out of order.

A further object is to provide such a mechanism which has no shafts, pulleys or the like disposed in the lawn mower blade housing, and thus has no tendency to clog or otherwise interfere with the rotary blade cutting action of the lawn mower.

A further object is to provide such a lawn edging mechanism which may be readily integrally incorporated in a rotary lawn mower in the manufacture thereof, or may be installed later on the lawn mower as an edger attachment.

A further object is to provide such a mechanism that is driven directly from the rotary blade of the lawn mower and requires no rotating or drive parts to be attached to the mower blade drive.

A further object is to provide such a mechanism which may be readily installed on a lawn mower without unduly modifying the existing structure thereof.

A further object is to provide such a mechanism which may be readily installed on a rotary lawn mower with only a small number of hand tools and a small amount of skill required in the installation.

A further object is to provide such an edging mechanism in a lawn mower which is quickly and easily disengageable from the mower blade drive when the lawn mowing action alone is desired.

A further object is generally to improve the design and construction of a lawn edging mechanism in a lawn mower.

The means by which the foregoing and other objects of the present invention are accomplished and the manner of their accomplishment will be readily understood from the following specification upon reference to the accompanying drawings, in which:

FIG. 1 is a top view of the edging mechanism of the present invention and a fragmentarily shown rotary lawn mower.

FIG. 2 is a side elevational view of the edging mechanism and the lawn mower.

FIG. 3 is an enlarged sectional view taken as on the line III—III of FIG. 2.

FIG. 4 is a sectional detail view taken as on the line IV—IV of FIG. 3.

FIG. 5 is a sectional detail view taken as on the line V—V of FIG. 3.

Referring now to the drawings in which the various parts are indicated by numerals, the lawn edging mechanism of the present invention is indicated by numeral 11, and a rotary type lawn mower is indicated by numeral 13. The lawn mower as illustrated is a typical one and includes a chassis having a substantially rectangular downwardly flanged platform structure 15 rollingly supported on wheels 17. Platform structure 15 includes a forward and a rearward portion and substantially flat upper and lower surfaces 19, 21. A handle 23 for guiding or propelling the lawn mower chassis is pivotally attached to the rearward portion of platform structure 15 by threaded fasteners 25 extending through flat stud portions 27 integrally formed with and extending upwardly from the rearward portion of platform structure 15. Motor means, as, for example, electric motor 29, is centrally mounted on platform structure 15 and includes a downwardly projecting shaft 31. It will be understood that other types of motor means, such as a gasoline motor, may be provided without departing from the spirit and scope of the present invention. An elongated blade 33 is securely fixed at the center portion 35 thereof to the end of shaft 31 by a coupling means 37. Blade 33 is disposed in the downwardly opening hollow interior of platform structure 15 and is rotatably driven by motor 29. Blade 33 includes two equal and alike half portions extending oppositely from center portion 35. Each half portion of blade 33 includes an intermediate portion 39 and an end portion 41. The leading edges of the oppositely disposed end portions 41 are sharpened and cut the grass as the blade 33 is rotated and the mower is moved forward.

Lawn edging mechanism 11 is disposed substantially laterally of mower 13 and is adapted to edge the lawn in a line along the side of the mower as it is moved forward or backward. The typical rotary mower has an exhaust opening or passageway in one side of the platform housing for allowing the cut grass to be expelled from under the mower. Mechanism 11 is disposed on that side of the mower which is opposite from the exhaust passageway and includes principally a substantially short shaft 43, bearing means supporting shaft 43 substantially over the path of blade 33, a drive wheel 45 disposed on one end of shaft 43, and a driven grass cutting member 47 disposed on the other end of the shaft.

The bearing means supporting shaft 43 includes an inner bearing 49 and an outer bearing 51. Supporting structure for bearings 49, 51 also is included in the bearing means of the mechanism and includes an inner guard structure 53 and an outer guard structure 55. Inner guard structure 53 is hollow and includes oppositely disposed substantially flat U-shaped panels 57, 59 and a curved connecting panel 61. Panels 57, 59 and 61 are connected along the respective edges thereof to form the downwardly open mouth box-like structure 53. Around the opening or mouth of structure 53 are provided support flanges 63 extending respectively from panels 57, 59, 61. A rectangular aperture 65 is provided in platform structure 15, and drive wheel 45 is disposed in aperture 65. Inner guard structure 53 covers aperture 65 and drive wheel 45. Suitable fasteners 67, extending through through apertures in support flanges 63, securely attach inner guard structure 53 to the upper surface 19 of platform structure 15. Outer guard structure 55 covers grass cutting member 47 and includes a flat U-shaped panel 69 and a curved panel 71. Panels 69, 71 are joined along the respective edges thereof and provide a structure of substantially L-shaped cross-section. Guard structure 55 is securely attached to platform structure 15 by screw fasteners 73 threadedly engaging the downwardly extending laterally disposed flange portion 75 of the platform structure.

Apertures 76, 78 are provided respectively in inner guard structure 53 and outer guard structure 55 and respectively provide openings for bearings 49, 51. Bearings 49, 51 respectively include body members 77, 79 and core members 81, 83. Bearings 49, 51 are of the so-called self-aligning type, and in each bearing the core member is multi-positionable relative to the body member. Core members 81, 83 of bearings 49, 51 are substantially alike. Body member 77 of inner bearing 49 is vertically movable, and body member 79 of outer bearing 51 is substantially fixed. A pair of collars 85, 87 are disposed respectively adjacent core members 81, 83 and prevent axial displacement of shaft 43.

Drive wheel 45 and blade portions 39 intermittently contact as the grass cutting member 47 is rotationally driven. Drive wheel 45 preferably is of the wire brush sort and typically includes a center portion of a pair of oppositely disposed hub discs 89 and a multiplicity of radially projecting steel wires 91 arranged around the circumference thereof. Wheel 45 is preferably fixedly secured to the inner end of shaft 43 in the following manner. The inner end portion of shaft 43 is provided with threads, and that portion is also provided with a flange portion 93. A nut 95 clamps discs 89 between flange portion 93 and a washer 97 and securely mounts wheel 45 to shaft 43.

Body member 79 of outer bearing 51 is securely attached to panel 69 of outer guard structure 55. A pair of threaded fasteners 99, extending through apertures in body member 79 and panel 69, secure bearing 51 to outer guard structure 55.

Bearing 49 is vertically adjustable for providing the desired distance between the center of wheel 45 and blade 33, which distance determines the amount of pressure of the outer portions of wheel 45 on blade 33. The structure of mechanism 11 providing the vertical adjustment of bearing 49 preferably is as follows: Body member 77 includes a pair of oppositely disposed grooves 101, as best seen in FIG. 5. The oppositely disposed side edges of aperture 76 of panel 57 receive respectively the oppositely disposed grooves 101 in body member 77. An apertured tab portion 103 is integrally formed with and projects substantially perpendicularly from the upper outside surface of body member 77. Another tab 105 is fixedly secured to inner guard structure 53 at the upper outside portion thereof. A threaded adjustment screw 107 threadedly engages tab 105 and extends through the aperture of tab portion 103. Oppositely disposed shouldered portions 109 are provided at the lower end of adjustment screw 107 and seat respectively against the upper and lower side surfaces of tab portion 103. A handle 111 is fixed to the upper end of adjustment screw 107. Turning handle 111 and adjustment screw 107 optionally moves bearing 49 up or down and thus moves wheel 45 up or down relative to blade 33.

Grass cutting member 47 preferably comprises a hub 113 and a plurality of wires 115. Hub 113 is provided with a tapered bore 117 and a circumferential flanged portion 119. A threaded and tapered portion is provided at the outer end of shaft 43. Hub 113 is secured on shaft 43 by a nut 121. Each of wires 115 includes a looped end portion 123. Wires 115 extend through oppositely disposed apertures 125 in hub flange 119 respectively at the looped end portions 123. Wires 115 are freely movable in apertures 125 and the centrifugally urged outwardly for the grass cutting action. Although grass cutting member 47 is of the centrifugally urged wire type and is the preferred type of lawn edge cutting member, it may be desirable in some applications to employ the solid blade type similar to lawn mower blade 33.

The use of mechanism 11, or a lawn mower provided with mechanism 11, is thought to have become apparent from the foregoing description of parts; however, for further clarification and disclosure, the manner of use will be described somewhat in detail. With the mower blade 33 rotating, edging member 47 may be made operative or inoperative by turning handle 111. Turning clockwise on handle 111 urges wheel 45 downwardly and the lower circumferential portion thereof into the path of the rotating blade 33. As will be noted with reference to FIGS. 1 and 2, blade 33 rotates in a counterclockwise direction and urges edging member 47 counterclockwise, as viewed in FIG. 2, or against the direction of movement of the lawn mower. Having the edge cutting member 47 rotating in a direction opposite the movement of the mower is not unusual in lawn edgers, for this permits the edger blade to leave a clean cut trench and also impels the dirt, rocks or the like in a direction away from the operator. This desirable feature is made manifest in a mechanically simple and practical way in the mechanism 11 of the present invention. In addition to engaging or disengaging edging member 47, rotating adjustment screw 107 with handle 111 also provides means for determining the degree of contact of drive wheel 45 with the intermediate portions 39 of blade 33. In some instances, it may be desirable to have wheel 45 contact blade 33 in a stronger manner in which the frictional contact between wheel 45 and blade 33 is greater. It will be understood that this greater frictional contact is possible since the steel wires, although somewhat stiff are nevertheless resilient and can permit the downward movement of the center of wheel 45 towards blade 33. It will be understood that this downward movement causes a slight spreading out of the periphery of wheel 45 which increases the frictional contact. Also the individual wires 91 offer more resistance as the contact with blade 33 is moved relatively radially inwardly from the distal outer end of the wires toward the center of wheel 45. This effect of the increase in friction as wheel 45 is moved downwardly can be appreciated when it is considered that the effect is somewhat similar to the movement of a rotating circular wire brush tool against a workpiece being wire brushed, in which case, if sufficient downward pressure is exerted, the speed of rotation of the wire brush will be slowed down by the increased frictional contact. The degree of contact of wheel 45 and blade 33 that is desirable is determined substantially by the power required for the particular edging job. For instance, if the device were being used for a first cut or original edging job, or in a job requiring heavy cutting actions, the frictional contact between wheel 45 and blade 33 would need to be greater than that necessary for a lighter cutting job. With reference to FIG. 3, it will be noted that wheel 45 intermittently engages the intermediate portion 39 of blade 33 and, as such, does not engage the sharpened end portion 41 of the blade and does not interfere with its cutting action. When it is desired to use the lawn mower without the edging mechanism, the user has only to raise wheel 45 off blade 33 by turning handle 111, and the lawn mower may then be used in a conventional manner.

It is apparent that mechanism 11 may be readily integrally incorporated in a rotary lawn mower, in the manufacture thereof, or may be installed later on the lawn mower as an edger attachment. Only a small number of hand tools and minimum skill is required in the installation of mechanism 11 as an edger attachment. A person has only to form a substantially small rectangular aperture, as aperture 65, in the blade housing or platform structure of the existing lawn mower, and to mount the drive wheel 45 and cutting member 47 as hereinabove described. The mechanism of the present invention has no shafts, pulleys or the like disposed in the lawn mower blade housing, which would have a tendency to clog or interfere with the rotary blade cutting action of the lawn mower. The mechanism of the present invention is substantially simple and sturdy and is readily kept in good working order. In summary, the present invention provides a very practical lawn edging mechanism in a lawn mower.

Although the present invention has been described and illustrated with respect to a preferred embodiment thereof, it is to be understood that it is not to be so limited since changes and modifications may be made therein which are within the full intended scope of this invention as hereinafter claimed.

I claim:

1. In a lawn mower having an elongated blade rotatably driven in a circular path about a substantially vertical axis, a mechanism for edging the lawn comprising shaft means, grass cutting means secured to said shaft means, wheel means coupled to said shaft means, said wheel means including yieldable wire means for fractionally and intermittently contacting said blade to rotatably drive said shaft means and said grass cutting means.

2. In a lawn mower having an elongated blade rotatably driven in a circular path about a substantially vertical axis, a mechanism for edging the lawn comprising shaft means, grass-cutting means secured to said shaft means, a wheel mounted on said shaft means, bearing means supporting said shaft means substantially over said circular path of said blade and substantially perpendicular to the axis of said blade, said wheel being disposed substantially vertically with a lower circumferential portion thereof tangentially intersecting the path of said blade, said mechanism being operative with said elongated blade and said lower circumferential portion of said wheel intermittently contacting one another and thereby rotatably driving said grass-cutting means through said wheel and said shaft means, and said wheel including radially projecting steel wires arranged around the circumference thereof.

References Cited by the Examiner

UNITED STATES PATENTS

| 2,538,230 | 1/1951 | Boggs | 56—25.4 |
| 2,742,751 | 4/1956 | Laughlin | 56—255 X |
| 3,053,035 | 9/1962 | Earley | 56—256 |

ABRAHAM G. STONE, *Primary Examiner.*

P. RAZZANO, *Assistant Examiner.*